United States Patent
Mayer

[15] 3,675,290
[45] July 11, 1972

[54] ADJUSTABLE TOOL HOLDER FOR RELEASABLE MILLING CUTTER BITS FOR USE IN REPLACEABLE-BIT MILLING CUTTER HEAD-TYPE MILLING MACHINE

[72] Inventor: Kurt Mayer, Tubingen, Germany

[73] Assignee: Montanwerke Water GmbH, Tubingen, Germany

[22] Filed: March 3, 1971

[21] Appl. No.: 120,667

[30] Foreign Application Priority Data

Sept. 2, 1970 Germany ..................P 20 43 453.1

[52] U.S. Cl. ...............................................29/96, 29/105 A
[51] Int. Cl. .....................................................B26d 1/00
[58] Field of Search ..................29/96, 97, 98, 105, 105 A

[56] References Cited

UNITED STATES PATENTS

| | | | |
|---|---|---|---|
| 3,270,396 | 9/1966 | Williams | 29/105 A |
| 3,104,453 | 9/1963 | Greenleaf | 29/105 A |
| 3,027,624 | 4/1962 | Payne | 29/105 A |

*Primary Examiner*—Leonidas Vlachos
*Attorney*—Flynn & Frishauf

[57] ABSTRACT

The milling cutter head has slots to receive bit holders; each holder is a plate-like body formed with an opening to hold the bit, and a pair of slits directed to the opening which define, therebetween, a tongue extending in the direction toward the opening into which the bit is inserted. By pressing the tongue toward or away from the slits, for example by means of a screw bearing against the side of the tongue, the position of the bit with respect to the cutting plane can be adjusted. The holder is additionally formed with a bearing surface fitting on the milling head, the bearing surface having a screw which can be screwed to extend slightly therefrom and thus tip the entire holder about the front edge of the milling cutter head, to provide for angular adjustment.

10 Claims, 5 Drawing Figures

ADJUSTABLE TOOL HOLDER FOR RELEASABLE MILLING CUTTER BITS FOR USE IN REPLACEABLE-BIT MILLING CUTTER HEAD-TYPE MILLING MACHINE

The present invention relates to a tool holder for replaceable, exchangeable or turnable cutter bits to be installed on milling machine milling heads, and more particularly to a tool holder which permits adjustment of the position of the cutter bit with respect to the cutting plane of the milling head after installation of the tool holder in the milling head.

Tool holders to retain cutting bits are known, see for example British Pat. No. 958,725, which shows holders having an opening formed therein in which the cutter head can be inserted. A screw is provided which acts against the head of the cutter bit to permit adjustment of the cutter bit-holder plate assembly with respect to the milling head. The particular arrangement permits adjustment of the cutter bit; it has been found, however, that accurate adjustment is difficult to make since the adjustment travel was rather coarse, so that fine positioning of the cutter head proved troublesome.

If a substantial number of cutter bits are used in a milling cutter with replaceable bit elements, it is necessary that each one of the cutter bits is accurately individually adjusted so that the cutting surfaces of the various bits all act on the same cutting plane, or in the same cutting circle. Tools of this kind frequently are so arranged that they are capable of simultaneously making coarse cuts and fine cuts, so that the work piece to be cut will have a resultant improved finish at the cut surface. In these tools it is important that one or more of the finished cutter bits are so adjusted that the adjustment angle of the finish cutting edge is exactly matched to the working conditions encountered, for example to the edge finish, as well as the stiffness of the entire working system. Additionally, the projection of the finish cutting bit beyond the projection of the rough cutting bit must be accurately set. If the cutting head is arranged only for finish cutting, then the centricity and the material removal projection of each cutter bit must be adjusted with high precision.

It is difficult to make milling cutter bits with a tolerance of less than ± 0.025 mm, and many cutter bits have a higher tolerance, particularly if made out of hard metal. When working on steel, however, optimum cutting conditions permit projection of fine or finish cutting blades over and beyond the rough cutting surfaces by a distance of from about 0.02 to 0.04 mm. This means that the cutter bits have to be adjusted after their insertion into the cutting head to enable them to run true with respect to the cutting plane, and to exactly cooperate with adjacent cutter heads; and, particularly when rough and finish cuts are being made at one time, to adjust the projection of the finish cutting bits beyond the cutting surface of the rough cutters by accurately determined amounts to provide optimum resulting cut surfaces and optimum cutting conditions.

In order to provide for adjustable holding of the cutter bits, it has been proposed to provide a plate-like holder having a bore terminating adjacent the wall of the holder against which the bit is to bear, and to screw an adjustment screw into the opening which has a ball-shaped final portion. The cutter holder is additionally formed with a slit which can be enlarged, or which can revert to its own size by screwing the ball-ended screw more or less into the slit, thus elastically deforming the entire holder plate. The plate, in essence, is then made of two parts, separated by the slit, which parts can be rocked with respect to each other. Such a holding arrangement provides for adjustment; in operation, however, it has been found that axial forces are transferred to the portion of the plate subjected to deformation by the ball-ended screw, so that at the abutment zones between the tool bit and the holder, high forces arise which are increased by the ball-shaped end of the adjustment screw and the edges of the slit. During milling operations, the point contact is so heavily loaded that deformations result which prevent further adjustment and, even during operation, interfere with the accuracy of previously made adjustments and additionally permit axial movement of the cutter bit itself. Since the plate has a pair of comparatively large parts which can move with respect to each other, it is practically unavoidable that the cutter bit itself is slightly rocked when the adjustment screw is operated, which additionally interferes with accurate cuts being made by the milling cutter, and additionally increases the time and accuracy of adjustment which must be made if the milling cutter is to run true and is to have an accurate orientation with respect to the surface to be cut.

It is an object of the present invention to provide a holder for replaceable cutter bit-type milling heads, which permits easy and simple adjustment of the cutter head with great accuracy, and which is additionally simple and ensures reliable maintenance of an adjustment, once made, during operation.

Subject matter of the present invention: Briefly, the holder comprises a support plate which has an opening formed therein to receive the cutter tip. The rear of the opening is defined by a support portion. A pair of slits are formed in the plate, terminating at the wall of the support portion, the slits defining therebetween a tongue, which extends slightly into the region of the opening. The orientation of the extension of the tongue into the opening with respect to the adjacent side wall is made at an angle different from 90°. By tightening a set screw against the tongue, to deform the tongue within the adjacent slits, the tongue is moved at an angle with respect to the adjacent support wall portion and a cutter bit, bearing against the tongue, is thus moved in or out with respect to the holder, enabling accurate and rapid adjustment of the utter bit, without change of adjustment during operation. The tongue itself is elastically tipped over its root, that is, about the region at the ends of the slits. Preferably, the tongue is of slightly lesser thickness than the thickness of the plate, so that its position between the slits can be adjusted even when the holder plate is secured in the milling cutter.

Adjustment of the set screw against the tongue provides for a micrometer-like adjustment of the position of the abutting surface for the cutting tip, so that the cutting edge of the cutting tip can be exactly adjusted with respect to the cutting plane. The elastic tongue is preferably arranged to extend through an inner end surface portion of the tool holder which extends in a direction somewhat parallel to the cutting plane. This permits axial forces occurring during the cutting operation to be fully absorbed by the entire cross-sectional material of the tongue, so that the cutter tip is always reliably held in position within the tool holder.

Slightly tipping the elastic tongue about its root permits the abutting region of the cutting tip to change, so that the distance of the cutting edge with respect to the cutting plane can be changed. Some types of milling machines additionally require angular adjustment of the cutter blade with respect to the cutting plane; cutting operations, for example edge cutting, or angular cutting may require angular surfaces, or compensation for tilt. To permit the entire holder to be tilted, one of the bearing walls of the holder adapted to bear against the milling head itself is formed with a tapped hole, into which a second adjustment screw can be inserted which bears against the bottom of the slot formed in the milling cutter and which permits slight tipping, or tilting of the entire cutter tip holder about the forward bearing edge of the milling head.

The tool holder itself is preferably formed with a back-up plate arranged at the side of the cutter bit. This plate may be integral with the tool holder body, or may be formed as a separate element screwed thereto.

The invention will be described by way of example with reference to the accompanying drawings, wherein.

Figure 1:
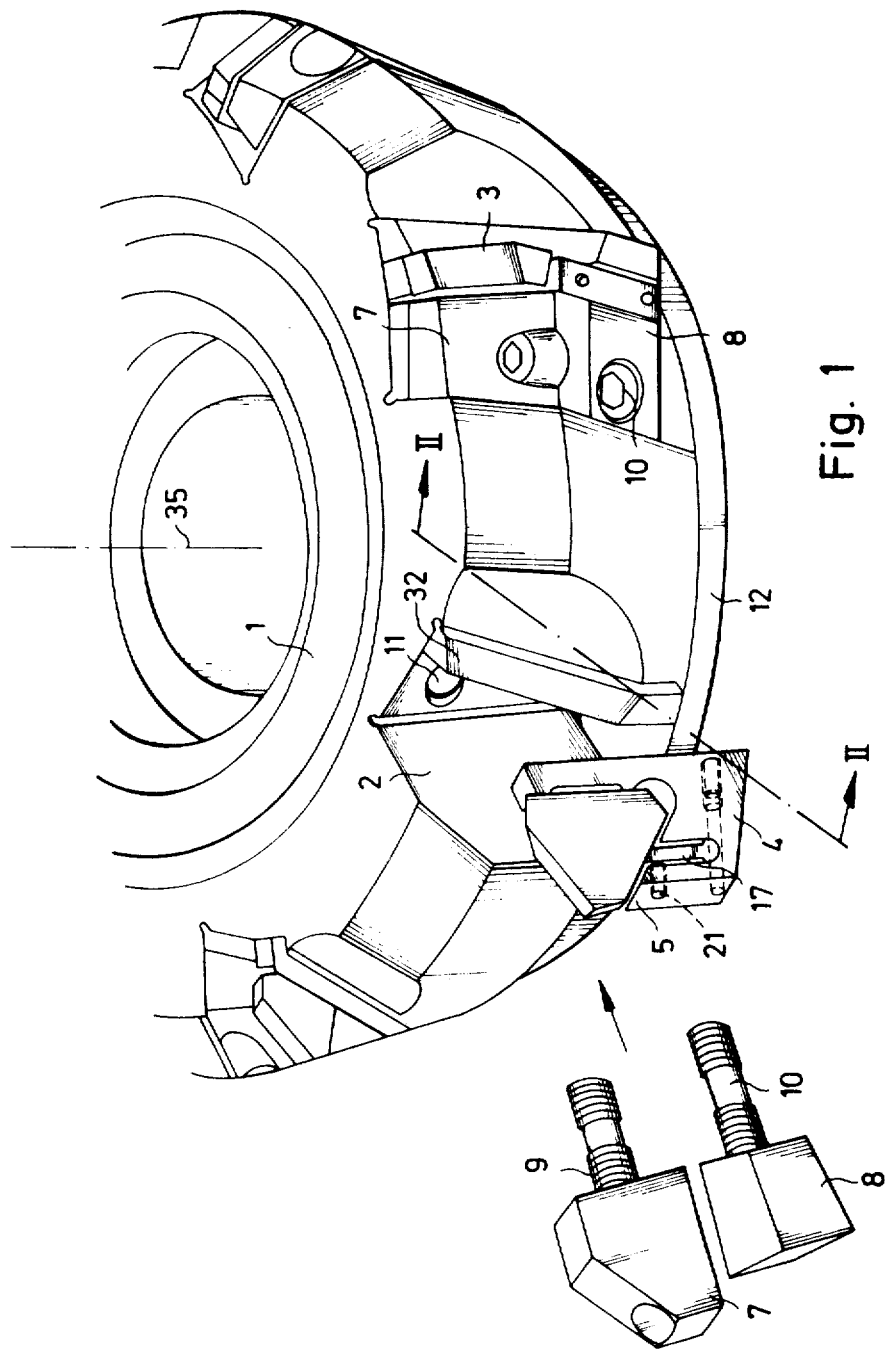
FIG. 1 is a schematic, perspective view of a milling cutter head with a tool holder in accordance with the invention, having a cutter tip located therein, removed from the milling head, and another cutter tip installed in the milling head.

A milling cutter head 1 has slots 2 formed therein which are shaped and made to receive an assembly of a cutter bit 3 in a holder 4. The cutter bits 3 are located in an opening 5 formed in the holder 3. Holder 4 is generally of plate-like form, and opening 5 is defined by bearing walls, against which the cutter bit 3 can bear. Holder 4 is held in groove 2 of the milling cutter head 1 by means of a pair of wedge-shaped holding elements 7, 8 which are threaded in known manner into threaded holes tapped into the milling cutter head 1. One of these holes is visible at 11, FIG. 1. To set the axial direction of the cutter bit 3, a ring 12 is secured to the milling head which closes off notches or grooves 2 and has a bearing surface 13 (FIG. 3) forming an abutment surface for the holder body 4. Ring 12 is secured to cutter head 1 by suitable means, such as by screws, not shown. Certain types of cutter heads do not need this ring; in other types, it can be formed integral with the milling head 1.

Figure 3:
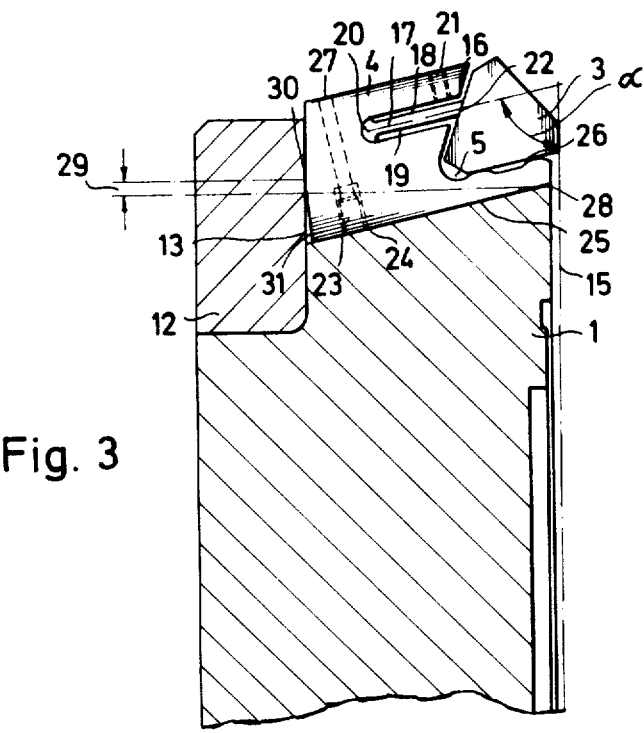
FIG. 3 is a schematic sectional view along lines III—III of FIG. 1.
Figure 4:
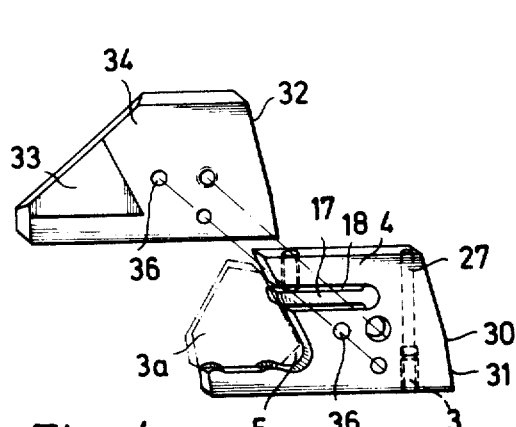
FIG. 4 is an exploded, perspective view of a cutter head having a separate side-back-up plate.
Figure 5:
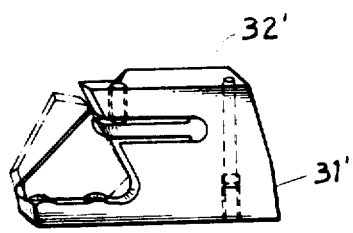
FIG. 5 is a perspective view of a holder in accordance with the present invention, in which a side-back-up plate is provided unitary with the holder body, showing a cutter tip inserted therein in phantom, chain-dotted presentation.

The cutting plane of the cutter bit is seen at 15, FIG. 3. In the wall 16 facing the cutting plane, a plate-like holding element is formed with an elastic tongue 17, defined on both sides by slits 18, 19, extending inwardly from opening 5, as best seen in FIGS. 3, 4 and 5. The root 20 (FIG. 3) of tongue 17 permits resilient deformation of the tongue within the limits of the slits 18, 19. Tongue 17 is unitary with plate 4 and extends with its end face into the opening 5 to form, as shown at 22, a bearing surface in axial direction for the cutter bit 3 (FIG. 3). The elastic tongue 17 includes an angle different from 90° with the adjacent wall 16 of the opening 5. Its position between the slits can be changed by tightening a screw 21, to tip or deflect the tongue about its root 20, and thus change the distance of the bearing surface or region 22 from the cutting plane 15. Thus, by changing the position of the adjustment screw 21, the cutting edge of bit 3 is changed with respect to the cutting plane 15. This change is very small, upon rotation of screw 21, with respect to the cutting plane 15. The elastic tongue 17 includes an angle α with respect to the cutting plane 15 which is smaller than 90°. Thus, the axial forces, acting perpendicularly with respect to the cutting plane can be stably accepted by the tongue, and any force components which arise and are in a vertical direction with respect to the cutter bit press the tongue against screw 21, so that the tongue is securely held in position against screw 21.

The thickness of the tongue 17 is slightly less than the thickness of plate 4, so that the tongue is relieved. Thus, the tongue can be adjusted even when the plate-like holder 4 is securely locked into the milling head 1.

In some types of milling cutters it is desirable to not only adjust the extend of projection of the milling cutter edge with respect to the cutting plane, but also to adjust the angle thereof. An adjustment screw 24 is threaded into a tapped opening 23 formed in the holder plate 4 and located at the rearward portion of wall 25 of holder 24, that is, adjacent the wall portion 26 of opening 5. Screw 23 has a slotted or otherwise formed adjustment head at the inside of the holder 4, which is accessible through a bore 27 to permit adjustment of screw 23 in its threaded opening from the outside. Adjustment of screw 23 to project beyond the bottom edge of the holder 4 will effect tipping of holder 4 about the front edge, thereby changing the angle of the milling cutter edge with respect to the cutting plane 15. To avoid change of projection, and to prevent movement of holder 4 away from the bearing surface formed on ring 12, it is desirable that the distance, in a force-transferring direction between the edge 25 and the bearing point 30 of the holder 4 against surface 13 on ring 12 is small. This distance is indicated at 29, FIG. 3. Tipping, without projecting movement is enabled by slightly tapering and relieving the rear face.

Lateral forces acting on the tool bit are accepted by a side back-up plate 32 which is inserted between the tool itself and the side wall of the notch formed in milling head 1. This plate 32 can be a separate plate, as illustrated in the embodiment of FIGS. 1 and 4, or it can be integral with the holder plate 4, as illustrated in the embodiments 2 and 5.

As seen in FIG. 3, the back-up plate is shaped somewhat similarly to the holder plate 4 and securely connected thereto. The interconnection between the back-up plate 32 and holder 4 may, for example, be effected by means of locating pins fitting into suitable matching openings and screws or bolts, passing through one element and threaded into the other, as schematically indicated by openings 36, FIG. 4. In the region of the opening 5 of the holder plate 4, plate 32 is formed with a free, ground and preferably lapped surface 33, forming an exact bearing surface for the cutter bit. FIG. 3 illustrates a cutter bit 3a suitable for a fine cut which, for example, can be arranged at one or the other location at the circumference of the milling head. The ground surface 33 can be so arranged that it includes a slight angle with respect to the surface 34 bearing against the holder plate 4, the angle being so oriented that the plate 32 is of decreasing thickness as the distance from the axis of rotation of the tool head, indicated in FIG. 1 at 35, increases.

Figure 2:
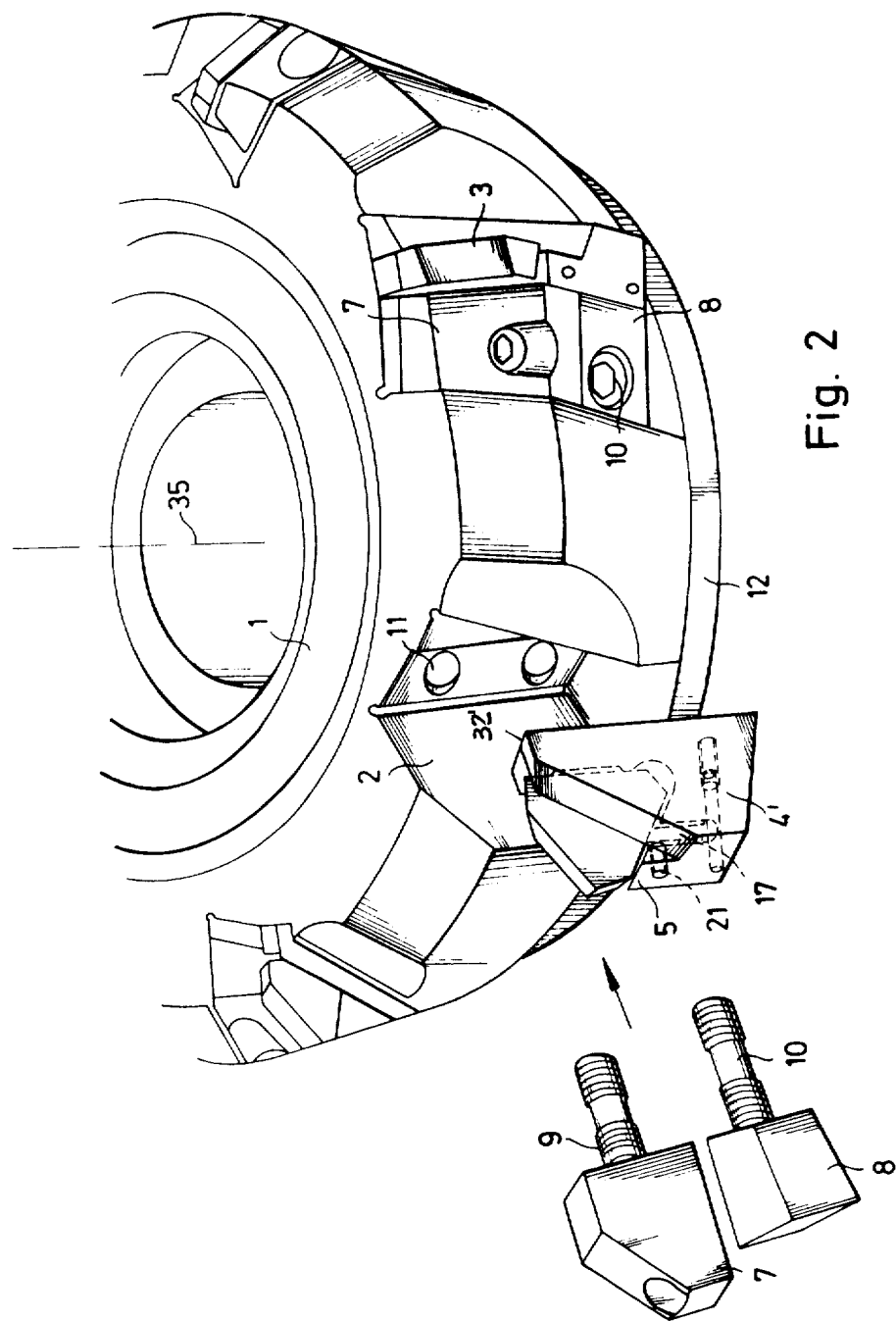
FIG. 2 is a perspective view similar to FIG. 1, in which the cutter tip holder is a unitary construction having a side back-up plate.

FIG. 2 is similar to FIG. 1 and illustrates a holder 4', seen in perspective view, turned side for side, in FIG. 5. The same reference numerals have been used in FIG. 2 as those previously discussed and the holder is similar in all major aspects with the difference, however, that the plate-like element is additionally formed with a bridge-like side portion, unitary therewith, and having the function and effect of the side back-up plate 32. Thus, a single unitary holder element is provided in which milling cutter bits can be placed for assembly into a milling head, the position of the cutter bits itself being adjustable within the holder and the position of the holder, itself, being adjustable within the milling cutter head by means of screws 23. The back-up region 32' of cutter 4' (FIGS. 2, 4) provides a back-up surface for the cutter bit 3. The element 4', like element 4, is slightly relieved at its rear wall, as clearly seen at 31', FIG. 5 to permit tipping of the unitary cutter holder 4' about the front edge of the milling head, as previously described in connection with FIGS. 1 and 3. If a separate plate is used, as illustrated in FIG. 4, then the shape of the plate 32 at the rear outline of the cutter holder is preferably similar to that of the holder plate, as seen in FIG. 4, although, if desired, plate 32 may be of somewhat different outline or configuration as determined by design requirements.

Various changes and modifications may be made in the structure within the inventive concept.

I claim:

1. Adjustable tool holder for releasable cutter bits for milling machines, in which the tool holder is adapted to be placed in a formed slot (2) of a milling head (1) comprising a plate-like support body (4) formed with an opening (5) shaped to receive the cutter bit (3), said opening supporting the bit in predetermined position with respect to the cutting plane (15) of the milling head and facing the side of the milling head directed towards the work piece to be milled, the opening being defined at its inner side by support wall portions (16) adapted to have the cutter bit (3) bear thereagainst;

said body (4) being further formed with a pair of slits (18,19) defining therebetween a tongue (17) integral with the body, said tongue (17) extending into the region of the tool bit receiving opening (5) and having a facing support edge (22);

and means (21) bearing against the tongue to vary the position of the tongue intermediate the slits and thus to vary the position of the tool bit (3) within the opening (5) and with respect to the cutting plane (15).

2. Tool holder according to claim 1, wherein the tongue (17) is of lesser thickness than the thickness of the body (4).

3. Tool holder according to claim 1, wherein the tongue extends in a direction with respect to the adjacent support wall portion (16) to form an angle therewith other than 90°.

4. Tool holder according to claim 1, wherein the tongue (17) and the cutting plane are inclined with respect to each other by an angle ($\alpha$) of less than 90°.

5. Tool holder according to claim 1, wherein the means (21) bearing against the tongue to vary its position intermediate the slits comprises a tapped opening formed in the body extending from an end surface toward the tongue;

and an adjustable screw threaded into the tapped opening and bearing against the tongue.

6. Tool holder according to claim 1, wherein the plate-like body (4) has a bottom edge (25) adapted to seat in the milling head;

said bottom edge is formed with a tapped opening (24);

and an adjustment screw screwed into said tapped opening, said adjustment screw bearing against the milling head and enabling tipping of the tool holder about the front support edge (28) of the milling head.

7. Tool holder according to claim 6, wherein the plate-like body is formed with a rear wall portion adapted to seat (30) in the milling head;

said rear wall portion being formed with a relief (31) to facilitate tipping of a tool holder in the head.

8. Tool holder according to claim 1, including a side cover-back-up plate (32) located adjacent the cutter bit receiving opening (5) of the plate-like body (4).

9. Tool holder according to claim 8, wherein the side cover plate and the plate-like body are a unitary, integral body.

10. Tool holder according to claim 8, wherein the side cover plate (32) in the region of the opening is formed with a ground surface (33).

* * * * *